United States Patent
Pretl et al.

(10) Patent No.: US 11,258,506 B2
(45) Date of Patent: Feb. 22, 2022

(54) METHOD AND APPARATUS FOR TRANSMITTING AND RECEIVING MULTIPLE CARRIERS WITH MULTIPLE ANTENNAS

(71) Applicant: Apple Inc., Cupertino, CA (US)

(72) Inventors: Harald Pretl, Schwertberg (AT); Werner Schelmbauer, Steyr (AT); Josef Holzleitner, Wels (AT)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/761,441

(22) PCT Filed: Mar. 29, 2018

(86) PCT No.: PCT/US2018/024984
§ 371 (c)(1),
(2) Date: May 4, 2020

(87) PCT Pub. No.: WO2019/108248
PCT Pub. Date: Jun. 6, 2019

(65) Prior Publication Data
US 2021/0175958 A1 Jun. 10, 2021

Related U.S. Application Data

(60) Provisional application No. 62/591,378, filed on Nov. 28, 2017.

(51) Int. Cl.
*H04L 5/00* (2006.01)
*H04B 7/08* (2006.01)
(Continued)

(52) U.S. Cl.
CPC ......... *H04B 7/0874* (2013.01); *H04B 1/0064* (2013.01); *H04B 7/0413* (2013.01); *H04L 5/0053* (2013.01)

(58) Field of Classification Search
CPC ......... H04L 5/001; H04L 5/0098; H04L 5/00; H04L 1/0003; H04L 1/0009;
(Continued)

(56) References Cited

U.S. PATENT DOCUMENTS 6,087,986 A * 7/2000 Shoki ........................ G01S 3/28
342/383
7,436,897 B2 * 10/2008 Sanada ................ H04B 7/0874
370/208

(Continued)

FOREIGN PATENT DOCUMENTS

KR 1020140111278 A 9/2014

OTHER PUBLICATIONS

International Search Report and Written Opinion in International Application No. PCT/US2018/024984, dated Aug. 29, 2018, 11 pgs.

*Primary Examiner* — Eva Y Puente
(74) *Attorney, Agent, or Firm* — Kowert, Hood, Munyon, Rankin & Goetzel, P.C.

(57) ABSTRACT

A method and apparatus for receiving and processing multiple carriers with multiple antennas. The device includes a plurality of antennas for receiving signals over a plurality of carriers, and a plurality of receive chains connected to each antenna for processing a signal received on each antenna. The signal received on each antenna is split into multiple receive chains for receive processing. The antennas are grouped into a plurality of sub-groups and a signal on a first carrier is received on a first sub-group of antennas and a signal on a second carrier is received on a second sub-group of antennas. A signal on a third carrier may be received on all antennas. Multiple-input multiple-output (MIMO) on the first and second carriers may be implemented using the first and second sub-group of antennas, respectively, and MIMO on the third carrier may be implemented using all antennas.

20 Claims, 7 Drawing Sheets

(51) Int. Cl.
*H04B 1/00* (2006.01)
*H04B 7/0413* (2017.01)

(58) Field of Classification Search
CPC ....... H04L 1/0019; H04L 1/0026; H04L 1/20;
H04L 25/0212; H04L 25/022; H04L
25/0224; H04L 5/0057; H04L 45/54;
H04W 72/042; H04W 72/0453; H04W
24/02; H04W 24/10; H04W 72/0426;
H04W 72/085; H04W 88/06; H04W
16/26; H04W 36/30; H04W 36/32; H04W
40/16; H04W 40/248; H04W 48/20;
H04W 4/02; H04B 17/336; H04B 17/364;
H04B 7/024; H04B 7/0626; H04B
7/0639; H04B 7/0691; H04B 7/15507;
H04B 7/2606; H04B 1/713; H04B
7/0604; H04B 7/10; H04B 7/12
USPC .......................................... 375/267; 342/378
See application file for complete search history.

(56) References Cited

U.S. PATENT DOCUMENTS

| | | | | |
|---|---|---|---|---|
| 9,654,187 | B2 * | 5/2017 | Hui | H04L 1/0019 |
| 9,877,312 | B2 * | 1/2018 | Kim | H04W 24/10 |
| 10,574,317 | B2 * | 2/2020 | Rakib | H04B 7/0613 |
| 2006/0066483 | A1 * | 3/2006 | Goldberg | H04B 7/08 342/378 |
| 2007/0184801 | A1 * | 8/2007 | Kogawa | H04B 7/0802 455/277.1 |
| 2009/0296666 | A1 | 12/2009 | Rimini | |
| 2012/0172096 | A1 * | 7/2012 | Samardzija | H01Q 1/246 455/575.7 |
| 2013/0242897 | A1 | 9/2013 | Meylan et al. | |
| 2016/0119925 | A1 | 4/2016 | Roessel et al. | |
| 2017/0054470 | A1 | 2/2017 | Reza et al. | |
| 2017/0127418 | A1 * | 5/2017 | Etemad | H04L 5/0053 |
| 2018/0069616 | A1 * | 3/2018 | Kim | H04B 7/0814 |
| 2019/0090233 | A1 * | 3/2019 | Fong | H04W 72/0453 |
| 2020/0169440 | A1 * | 5/2020 | Thomas | H04L 27/2613 |

* cited by examiner

METHOD AND APPARATUS FOR TRANSMITTING AND RECEIVING MULTIPLE CARRIERS WITH MULTIPLE ANTENNAS

CROSS REFERENCE TO RELATED APPLICATIONS

This application is a national stage application, filed under 35 U.S.C. § 371, of International Patent Application No. PCT/US2018/024984, filed on Mar. 29, 2018, titled "Method And Apparatus For Transmitting And Receiving Multiple Carriers With Multiple Antennas", which claims priority under 35 U.S.C. § 119(e) to U.S. provisional application No. 62/591,378, filed on Nov. 28, 2017. Both of those applications are incorporated by reference herein in their entireties.

FIELD

Examples relate to a device and method for implementing carrier aggregation, more particularly, a device and method for receiving and processing multiple carriers with multiple antennas.

BACKGROUND

In order to meet the increasing demands for data rates, carrier aggregation has been introduced in the wireless communication system, such as Long Term Evolution (LTE)-Advanced. Carrier aggregation allows combining a number of separate carriers to increase the peak data rates and overall capacity of the networks.

Carrier aggregation may be implemented by using contiguous component carriers within the same operating frequency band (intra-band contiguous aggregation). However, this might not always be possible due to frequency allocations to operators. For non-contiguous allocation it could either be intra-band (i.e. the carriers belong to the same operating frequency band) or inter-band (i.e. the carriers belong to different operating frequency bands).

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Examples are disclosed for an apparatus and method which make use of available multiple antennas (e.g. four antennas) for receiving more than one carrier within one frequency band.

Hereafter, the examples will be explained with reference to a mobile device (e.g. a mobile phone) having four antennas for receiving three carriers in one frequency band. However, it should be noted that the examples disclosed herein are applicable to a device having any number of antennas for different frequency ranges and capable of receiving any number of carriers in one frequency band.

The examples will be explained with reference to intra-band non-contiguous carrier aggregation but the examples are also applicable to inter-band carrier aggregation. The carriers that a device receives simultaneously may be non-contiguous in the same frequency band or in different frequency bands. The examples will be explained for receive processing, but the examples are applicable to transmit processing as well.

Due to the rising demands for increased data rate, a demand for receiving more than one carrier within one frequency band becomes more and more important. In order to receive more than one carrier within a receive band dedicated circuits may be used which are able to split the received signal into different branches for feeding them to dedicated down-conversion mixers for each carrier. The number of carriers which have to be received in one frequency band defines the number of used split branch circuits (e.g. receiving 2 carriers in one band needs double-split functionality). An increased number of split branches increases the chip area and may cause crosstalk issues because of the limited isolation between the branches (e.g. the local oscillator signal of one split branch may leak into the other).

Figure 1:
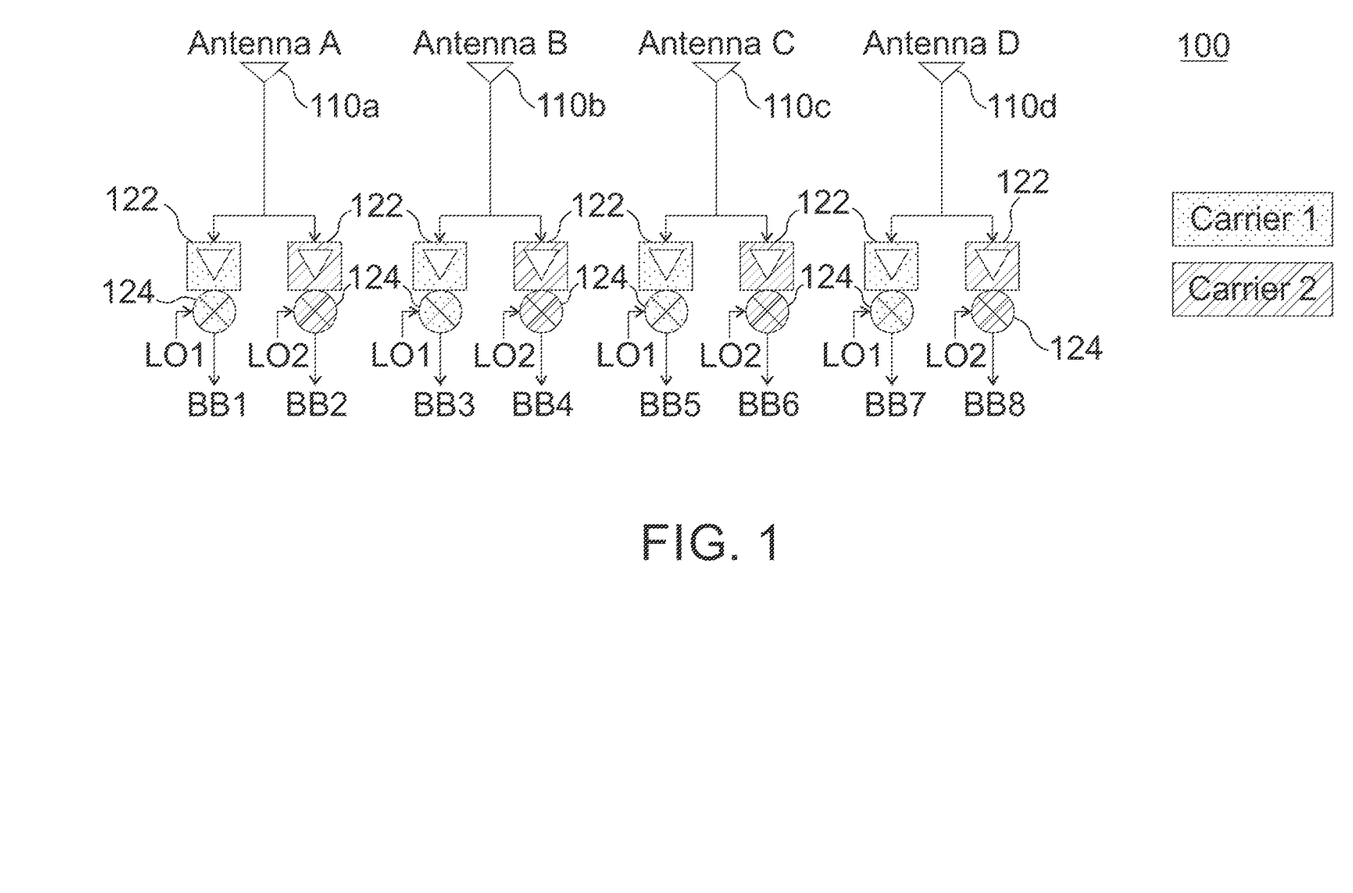
FIG. 1 shows a receiver having four antennas and capable of receiving two carriers within one frequency band.

FIG. 1 shows a wireless communication device having four antennas and capable of receiving two carriers within one frequency band. The device 100 can receive two carrier signals simultaneously with four antennas 110a-110d. The signal captured by each antenna 110a-110d are split into two signal branches (receive chains), respectively. Each branch signal is amplified by an amplifier 122, and then mixed with a corresponding local oscillator signal (LO1 or LO2) by a mixer 124 and forwarded for baseband processing. For simplicity, not all analog processing components in the receive chains are shown in the drawing. With this receiver structure, the device 100 may receive two carriers simultaneously.

Figure 2:
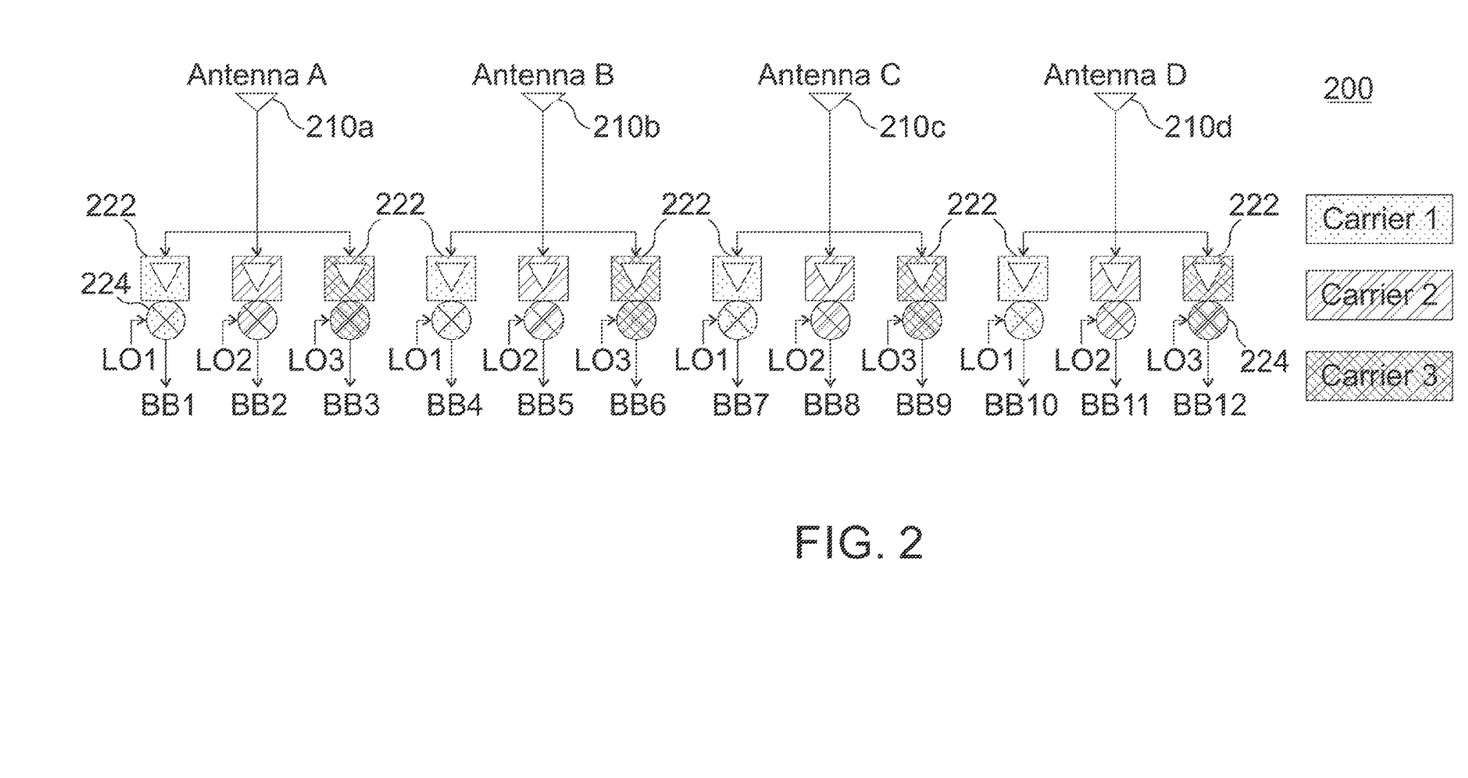
FIG. 2 shows an example structure of a receiver for receiving three carriers per frequency band.

Due to fragmented frequency band allocations there is a rising demand to receive more than two carriers per frequency band. An example device for receiving more than two carriers per frequency band is shown in FIG. 2. In FIG. 2, the device 200 receives three carrier signals with four antennas 210a-210d and the carrier signal captured by each antenna 210a-210d is split into three signal branches. Each branch signal is amplified by an amplifier 222, and then mixed with a corresponding local oscillator signal (LO1, LO2, or LO3) by a mixer 224 and forwarded for baseband processing.

This approach for receiving more than two carriers per frequency band has many drawbacks that will limit the receiver performances because of additional mixing chains per antenna. First, more hardware components and therefore increased chip area would be needed for the additional processing chain for the third branches in FIG. 2. Second, more crosstalk issues would arise because the local oscillator signals may couple to each other (e.g. due to limited reverse isolation of low noise amplifier (LNA) circuits), and thus degrade the transmission and reception of signals carrying data.

Examples disclosed herein may provide a device which accommodates the demand for increased carrier reception or transmission, without requiring additional hardware for processing by intelligent usage of the antennas and a configurable use of those antennas and components in the receive/transmit chains.

Figure 3:
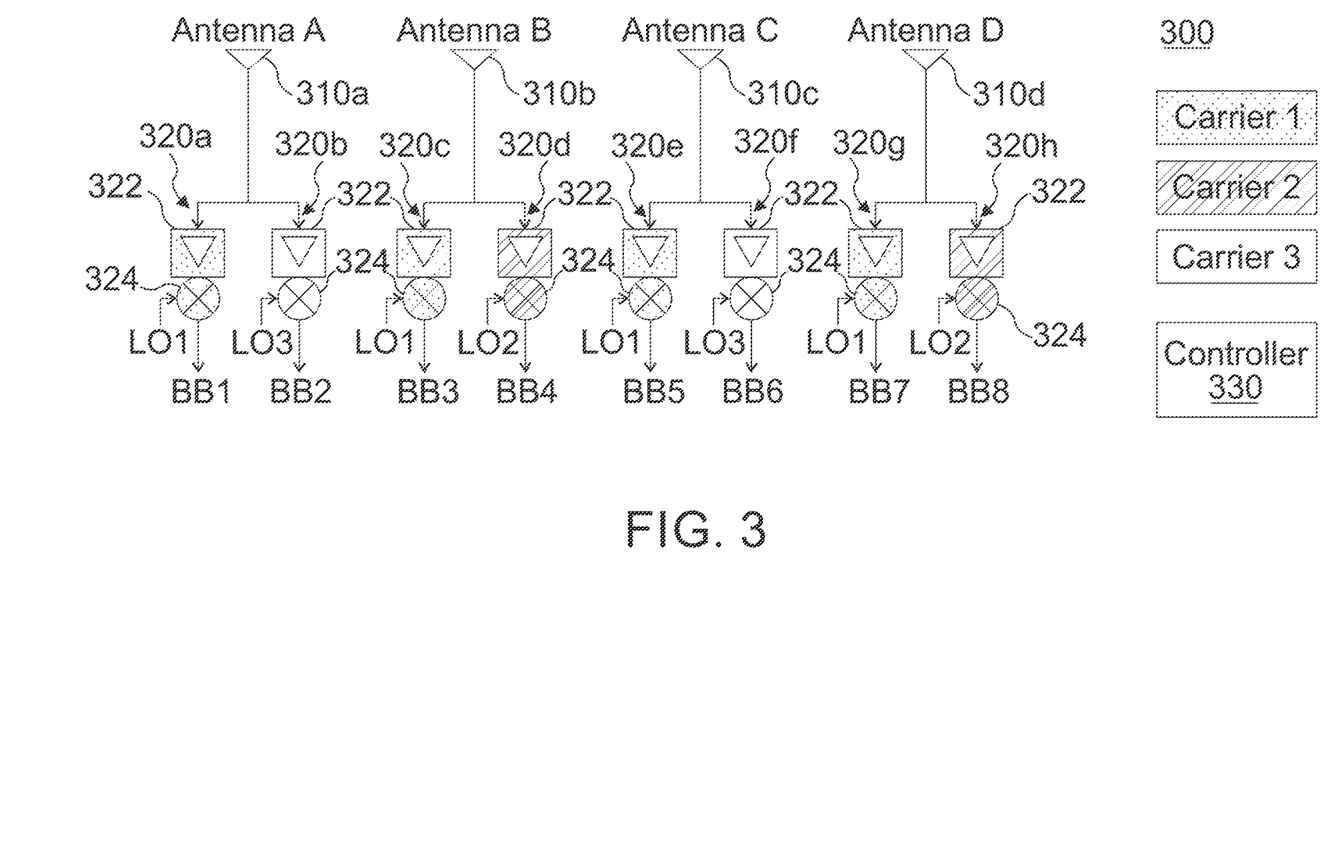
FIG. 3 is a schematic diagram of an example device having four antennas and capable of receiving three carriers in one or more frequency bands.

FIG. 3 is a schematic diagram of an example device 300 having four antennas 310a-310d and capable of receiving up to eight carriers (e.g. component carriers) in one or more frequency bands. The device 300 (e.g. a user device such as a mobile device) includes a plurality of antennas 310a-310d (e.g. four antennas) and a plurality of receive chains 320a-320h (in this example two receive chains for each antenna 310a-310d) for receive processing (e.g. baseband processing BB1-BB8). The device 300 may include more than, or less than, four antennas, and more than two receive chains for each antenna. Each receive chain 320a-320b includes analog front-end components such as a low noise amplifier(s), a filter(s), a mixer, and the like, and digital processing components (not shown) for receive processing of the signal captured by the antennas. For simplicity, not all processing components of the receive chain 320a-320b are shown in FIG. 3.

It should be noted that other mixing chain and antenna combinations may be used without departing from the scope of the examples, and the antenna and corresponding carrier mixing chains may not be identically repeated per antenna so that a platform space may be reduced, and potential signal interferences, for example, crosstalk between local oscillators in a mixing chain, can be mitigated. It should be noted that crosstalk issues may be more prevalent in frequency division multiplexing (FDM) systems due to extreme sensitivities and slight offsets in peak frequencies utilized, though the examples may also be beneficial and provide similar advantages in time division multiplexing (TDM) systems, especially those which may additionally layer FDM techniques on top of TDM carrier signals.

The device 300 receives signals on a plurality of carriers (receive carriers) using the plurality of antennas 310a-310d. The received signal on each antenna 310a-310d is split onto multiple corresponding receive chains 320a-320h for receive processing. The device 300 includes a clock signal generator(s) (not shown) for generating local oscillator signals at specific frequencies to be mixed with the received signal at the mixer 324 for extracting a corresponding carrier signal. The extracted carrier signal on each receive chain is then sent for further processing (e.g. baseband processing). The device 300 may implement multiple-input multiple-output (MIMO) processing or any multi-antenna transmit/receive processing with the plurality of antennas 310a-310d so that more than one spatial channel or data stream may be received simultaneously. The device 300 includes a controller configured to group the antennas into a plurality of sub-groups and assign each carrier to a specific sub-group of antennas, which will be explained in detail below.

The device 300 is capable of receiving more than one carrier (e.g. three carriers or more) simultaneously within one frequency bands. The plurality of carriers that the device 300 receives may be in a single frequency band or in different frequency bands. For example, the device 300 may implement non-contiguous carrier aggregation over at least two carriers to receive multiple data streams simultaneously. The carriers that the device 300 receives (or transmits) may belong to the same radio access technology (RAT) or different RATs. For example, the device 300 may receive or transmit one or more carriers in a cellular wireless system (such as LTE or Third Generation) and another one or more carriers in WiFi, Bluetooth, or any other RATs.

In one example, the controller 330 may group the antennas 310a-310d into multiple sub-groups (e.g. two sub-groups) and assign each carrier to a specific sub-group of antennas. The number of antennas belonging to a sub-group may be one, two, or more than two, or may be all antennas. The device 300 then may receive one (or more than one) carrier with one sub-group of antennas and another one or more carriers with another sub-group of carriers. For example, a signal on a first carrier may be received on a first sub-group of antennas and a signal on a second carrier may be received on a second sub-group of antennas. The controller 330 may assign another carrier to all antennas such that the device 300 may receive another carrier with all antennas. In the example of FIG. 3, antenna 310a and antenna 310c are grouped and antenna 310b and antenna 310d are grouped, and carrier 3 is received with antenna 310a and 310c and carrier 2 is received with antenna 310b and 310d, and carrier 1 is received with all antennas 310a-310d. In this example, the device 300 needs only two receive chains for receiving three carriers (i.e. in general, the number of receive chains needed is smaller than the number of carriers that the device simultaneously receives). The device 300 may implement a MIMO or multi-antenna transmission/reception scheme for carriers 2 or 3 using two antennas (e.g. 310a and 310c for carrier 3, and 310b and 310d for carrier 2), and implement a MIMO or multi-antenna transmission/reception scheme for carrier 1 using four antennas 310a-310d. For example, the device 300 may implement 4×4 MIMO on carrier 1 and implement 2×2 MIMO on carriers 2 and/or 3, respectively, using two different sets of antennas.

The device 300 uses the available multiple antennas 310a-310d for performing the split functionality. The device 300 implements a flexible tradeoff between the number of received carriers per frequency band and the number of used antennas per carrier. This flexible usage of multiple antennas can be used to mitigate crosstalk between carriers.

Figure 4:
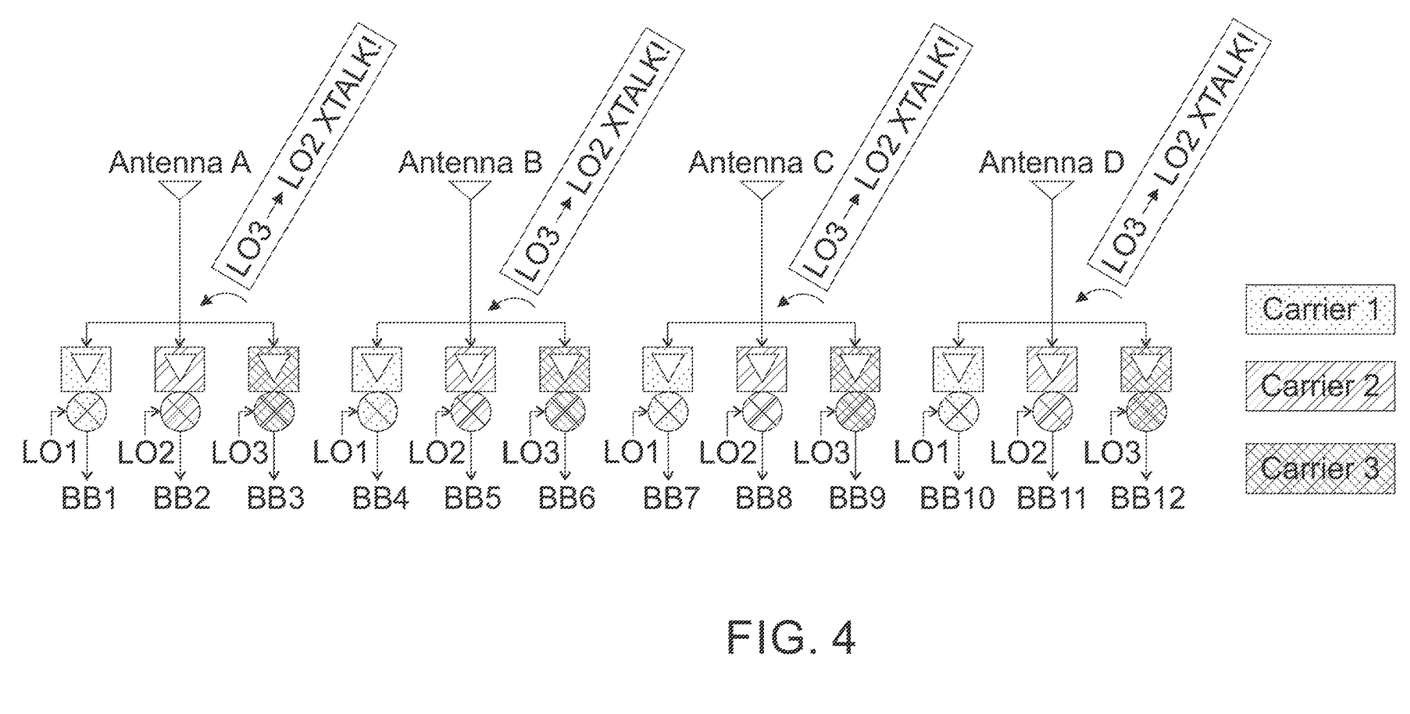
FIG. 4 shows an occurrence of crosstalk in a receiver.

A crosstalk may occur between receive chains. A crosstalk may occur just for certain local oscillator frequency combinations. For example, if a device 300 receives three carriers with three different local oscillator frequencies, a crosstalk may not necessarily occur among all local oscillator frequencies but may occur between certain local oscillator frequencies. FIG. 4 shows an occurrence of crosstalk in a receiver in FIG. 2 from a receive branch 3 using a local oscillator 3 to a receive branch 2 using a local oscillator 2. A crosstalk may not occur between receive branches 1 and 2.

The examples disclosed herein help mitigate potential crosstalk issues. Crosstalk issues are very special cases as relevant crosstalk is generated simply by certain local oscillator frequency combinations. In other words, if a device platform is configured to receive three carriers with three different local oscillator frequencies in non-identical mixing chains, some local oscillator to local oscillator crosstalk between chains, can be reduced.

The receiver structure in the example shown in FIG. 3 can mitigate occurrence of this crosstalk by intelligent usage of multiple antennas. In the examples, the crosstalk in each antenna/receive chain may be lessened by intelligent usage and/or selection of the antennas and respective receive chains, as shown in the example of FIG. 3. In order to eliminate or reduce the crosstalk, the controller 330 may assign carriers to the antennas and receive chains based on the isolations among antennas and among analog front-end components (e.g. low noise amplifiers, mixers, etc.) in different receive chains. For examples, in order to eliminate or reduce the crosstalk between carrier 2 and carrier 3, in FIG. 3, carrier 2 may be allocated to antennas 310b and 310d, and carrier 3 may be allocated to antennas 310a and 310c. Due to the antenna isolation and the isolation of analog front-end components, the crosstalk can be significantly reduced.

In accordance with the examples, a less chip area would be needed for receiving multiple carriers in one band since less receive chains would be needed for receiving the carriers. The receiver may not suffer from crosstalk because the receive chains may not be coupled to each other and be isolated sufficiently. The device may have more flexibility for being able to trade between the number of received carriers and the number of used antennas per carrier. The examples may cover the demand for more than two carriers without extra hardware effort by intelligent usage of the antennas.

Figure 5A:
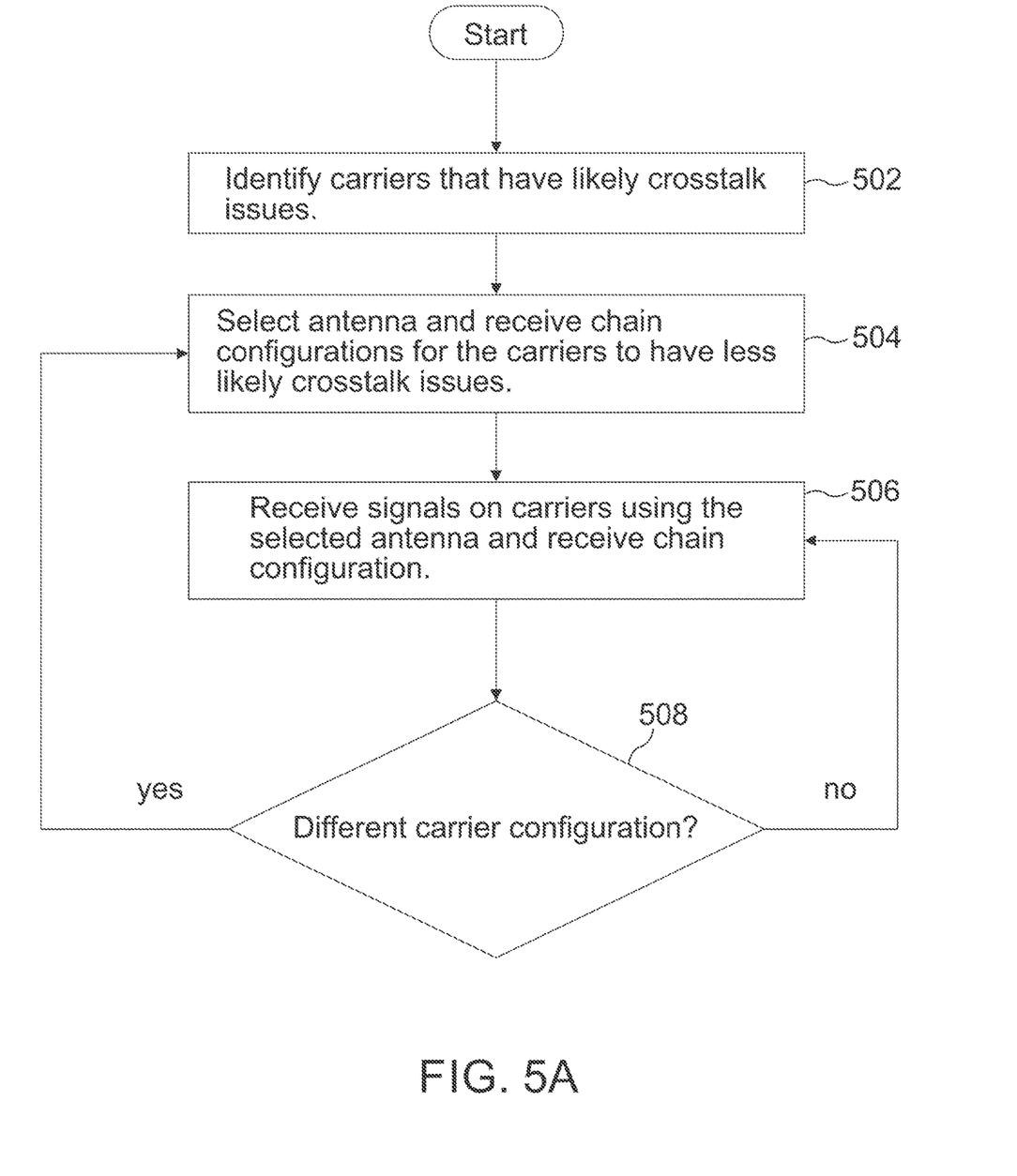
FIG. 5A is a flow diagram of an example process for configuring antenna and receive chain.

FIG. 5A is a flow diagram of an example process for configuring antenna and receive chain. A controller 330 identifies carriers per antenna that have likely crosstalk issues (502). The controller 330 then selects antenna and receive chain configurations (e.g. MIMO configuration, a mixer) for the carriers to have less likely crosstalk issues (e.g. selecting an antenna sub-group and receive chain for each carrier) (504). As explained above, the antennas and receive chain may be selected based on the isolations among antennas and among analog front-end components in different receive chains. The receiver 300 receives signals (e.g. MIMO signals) on carriers using the selected antenna and receive chain configuration (506). If carrier configuration becomes different subsequently (e.g. different carriers are assigned for the receiver) (508), selection of antenna and receive chain may be performed again for the new configuration of carriers.

Figure 5B:
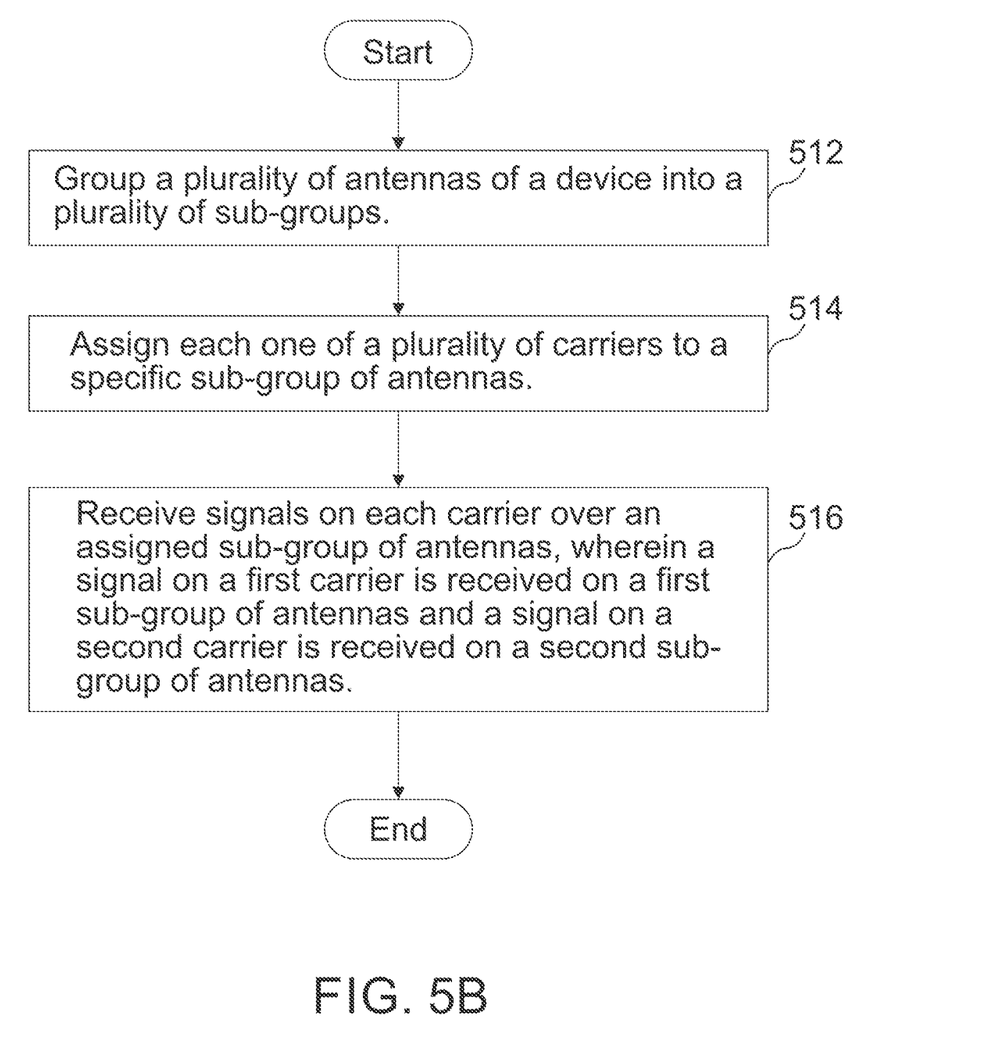
FIG. 5B is a flow diagram of an example process of receiving signals with multiple antennas in a receiver.

FIG. 5B is a flow diagram of an example process of receiving signals with multiple antennas in a receiver. A controller 330 groups a plurality of antennas into a plurality of sub-groups (512). Multiple receive chains are coupled to each antenna. The controller 330 assigns each one of a plurality of carriers to a specific sub-group of antennas (514). The receiver 300 then receives signals on each carrier over an assigned sub-group of antennas (516). For example, a signal on a first carrier may be received on a first sub-group of antennas and a signal on a second carrier may be received on a second sub-group of antennas.

It should be noted that even though the examples above are explained for the receive processing and the drawings depict a structure of a receiver only, the examples disclosed herein are also applicable to the transmit processing and a transmitter structure. For example, multiple transmit chains may be coupled to each of a plurality of antennas and the controller 330 may group the antennas into a plurality of sub-groups and assign each one of a plurality of transmit carriers to a specific sub-group of antennas. The transmitter then transmits signals on each transmit carrier on an assigned sub-group of antennas. For example, a signal on a first transmit carrier may be transmitted on a first sub-group of antennas and a signal on a second transmit carrier may be transmitted on a second sub-group of antennas. The transmit carrier and the receive carrier on which the device transmits and receives may be same or may be different.

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

Figure 6:
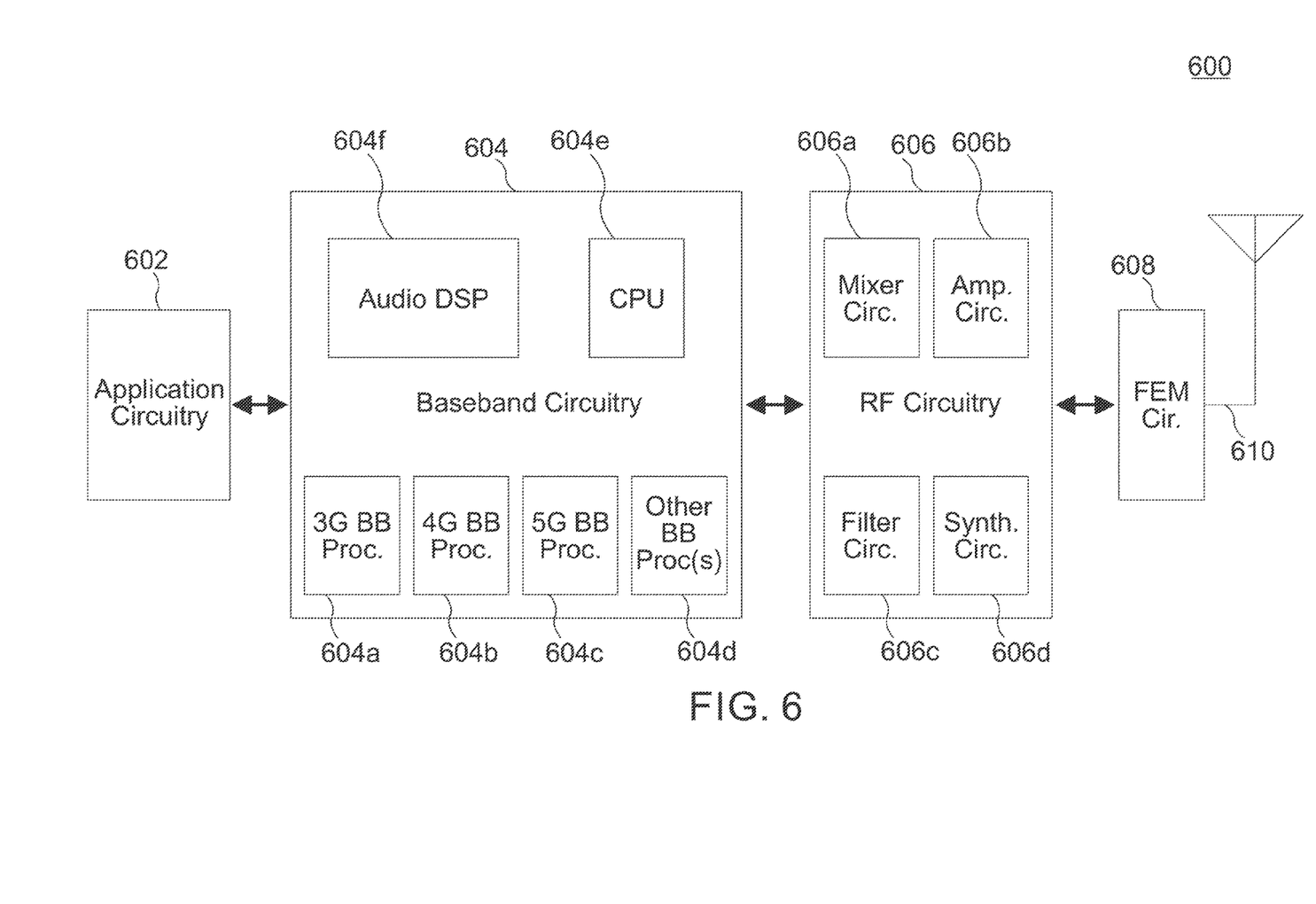
FIG. 6 illustrates, for one embodiment, example components of an electronic device.

The non-uniform transceiver and selectable antenna system may be utilized in a wireless communication device as shown in FIG. 6. As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 6 illustrates, for one embodiment, example components of an electronic device 600.

In embodiments, the electronic device 600 may be, implement, be incorporated into, or otherwise be a part of a user equipment (UE) or network access station such as an evolved Node B (eNB) or gNode B (gNB). In some embodiments, the electronic device 600 may include application circuitry 602, baseband circuitry 604, Radio Frequency (RF) circuitry 606, front-end module (FEM) circuitry 608 and one or more antennas 610, coupled together at least as shown. In embodiments where the electronic device 600 is implemented in or by a new radio (NR) gNB, the electronic device 600 may also include network interface circuitry (not shown) for communicating over a wired interface (for example, an X2 interface, an S1 interface, and the like).

The application circuitry 602 may include one or more application processors or processing units. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include computer-readable media (also referred to as "CRM", "memory", "storage", or "memory/storage") and may be configured to execute instructions stored in the CRM to enable various applications and/or operating systems to run on the system and/or enable features of the inventive embodiments to be enabled.

The baseband circuitry 604 may include circuitry such as, but not limited to, one or more single-core or multi-core processors to arrange, configure, process, generate, transmit, receive, or otherwise utilize an NR PUCCH having multiple slot duration as described in various embodiments herein. The baseband circuitry 604 may include one or more baseband processors and/or control logic to process baseband signals received from a receive signal path of the RF circuitry 606 and to generate baseband signals for a transmit signal path of the RF circuitry 606. RF circuitry 606 may include mixing chains for each antenna, at least 2 mixing chains having a local oscillator in one chain/mixing split being different from the other proximate mixing chain, to reduce potential cross talk interference between mixing chains per antenna of a transmitted or received signal having two or more peak carrier frequencies. RF circuitry 606 and/or front end circuit 608 and antennas 610 being adapted per various inventive embodiments discussed above.

Baseband circuitry 604 may interface with the application circuitry 602 for generation and processing of the baseband signals and for controlling operations of the RF circuitry 606. For example, in some embodiments, the baseband circuitry 604 may include a third generation (3G) baseband processor 604a, a fourth generation (4G) baseband processor 604b, a fifth generation (5G)/NR baseband processor 604c, and/or other baseband processor(s) 604d for other existing generations, generations in development or to be developed in the future (e.g., 6G, etc.). The baseband circuitry 604 (e.g., one or more of baseband processors 604a-d) may handle various radio control functions that enable communication with one or more radio networks via the RF circuitry 606. The radio control functions may include, but are not limited to, signal modulation/demodulation, encoding/decoding, radio frequency shifting, and the like. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network (E-UTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be configured to run elements of the protocol stack for signaling of the PHY, MAC, RLC, PDCP and/or RRC layers. In some embodiments, the baseband circuitry may include one or more audio digital signal processor(s) (DSP) 604f. The audio DSP(s) 604f may include elements for compression/decompression and echo cancellation and may include other suitable processing elements in other embodiments. The baseband circuitry 604 may further include computer-readable media (also referred to as "CRM", "memory", "storage", or "CRM"). The CRM may be used to load and store data and/or instructions for operations performed by the processors of the baseband circuitry 604. CRM for one embodiment may include any combination of suitable volatile memory and/or non-volatile memory. The CRM may include any combination of various levels of memory/storage including, but not limited to, read-only memory (ROM) having embedded software instructions (e.g., firmware), random access memory (e.g., dynamic random access memory (DRAM)), cache, buffers, etc.). The CRM may be shared among the various processors or dedicated to particular processors. Components of the baseband circuitry 604 may be suitably combined in a single chip, a single chipset, or disposed on a same circuit board in some embodiments. In some embodiments, some or all of the constituent components of the baseband circuitry 604 and the application circuitry 602 may be implemented together, such as, for example, on a system on a chip (SOC).

In some embodiments, the baseband circuitry 604 may provide for communication compatible with one or more radio technologies. For example, in some embodiments, the baseband circuitry 604 may support communication with an E-UTRAN, NR and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc., (e.g., mixing chains) to facilitate the communication with the wireless network. RF circuitry 606 may include a receive signal path that may include circuitry to down-convert RF signals received from the FEM circuitry 608 and provide baseband signals to the baseband circuitry 104. RF circuitry 606 may also include a transmit signal path that may include circuitry to up-convert baseband signals provided by the baseband circuitry 604 and provide RF output signals to the FEM circuitry 608 for transmission. FEM 608 may be dynamically selectable, or statically configured to have components arranged to transmit/receive signals per antenna path which are not identical to another receive path in order to processes signals to have reduced interference compared to alternative paths. In other words, the FEM may include switchable filters and analog processing elements which are different for each different possible antenna configuration available. It is noted that each antenna and XMIT/RCV chain of device 600 is NOT identical to, i.e., not the same as, at least one other antenna XMIT/RCV path so that platform interference, such as LO crosstalk in processing multiple carriers per antenna, may be reduced.

In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path will include at least two different mixer configurations, and may be arranged for quadrature down-conversion and/or up-conversion, respectively. In some embodiments, the mixer circuitry 606a of the receive signal path and the mixer circuitry 606a of the transmit signal path may include at least two different signal paths, wherein each signal path is for processing different carriers from the other signal path.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect, as other types of frequency synthesizers may be suitable. For example, synthesizer circuitry 606d may be a delta-sigma synthesizer, a frequency multiplier, or a synthesizer comprising a phase-locked loop with a frequency divider. The synthesizer circuitry 606d may be configured to synthesize an output frequency for use by the mixer circuitry 606a of the RF circuitry 606 based on a frequency input and a divider control input. In some embodiments, the synthesizer circuitry 106d may be a fractional N/N+1 synthesizer.

In some embodiments, frequency input may be provided by a voltage-controlled oscillator (VCO), although that is not a requirement. Divider control input may be provided by either the baseband circuitry 604 or the application circuitry 602 depending on the desired output frequency. In some embodiments, a divider control input (e.g., N) may be determined from a look-up table based on a channel indicated by the application circuitry 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 606 may include an IQ/polar converter.

FEM circuitry 608 may include at least two receive signal paths that differ from each other and may include circuitry configured to operate on RF signals received from two or more antennas 610, amplify the received signals and provide the amplified versions of the received signals to the RF circuitry 606 for further processing. In some embodiments, FEM circuitry 608 may may include at least two transmit signal paths that may include circuitry different from the other and configured to amplify signals for transmission provided by the RF circuitry 606 for transmission by one or more of the one or more antennas 610. In some embodiments, the FEM circuitry 608 may include a TX/RX switch to switch between transmit mode and receive mode operation. The FEM circuitry 608 may include one or multiple receive signal paths and one or multiple transmit signal paths but at least multiple paths for RCV or XMIT which are not identical to another. The receive signal path(s) of the FEM circuitry may include a low-noise amplifier (LNA) to amplify received RF signals and provide the amplified received RF signals as an output (e.g., to the RF circuitry 606). The transmit signal path(s) of the FEM circuitry 608 may include a power amplifier (PA) to amplify input RF signals (e.g., provided by RF circuitry 606), and one or more filters to generate RF signals for subsequent transmission (e.g., by two or more antennas 610).

In some embodiments, the electronic device 600 may include additional elements such as, for example, a display, a camera, one or more sensors, and/or interface circuitry (for example, input/output (I/O) interfaces or buses) (not shown). In embodiments where the electronic device is implemented in or by an eNB, the electronic device 600 may include network interface circuitry. The network interface circuitry may be one or more computer hardware components that connect electronic device 600 to one or more network elements, such as one or more servers within a core network or one or more other eNBs via a wired connection. To this end, the network interface circuitry may include one or more dedicated processors and/or field programmable gate arrays (FPGAs) to communicate using one or more network communications protocols such as X2 application protocol (AP), S1 AP, Stream Control Transmission Protocol (SCTP), Ethernet, Point-to-Point (PPP), Fiber Distributed Data Interface (FDDI), and/or any other suitable network communications protocols.

The examples as described herein may be summarized as follows:

Example 1 is a device for receiving or transmitting multiple carriers with multiple antennas. The device comprises a plurality of antennas for receiving or transmitting signals on a plurality of carriers, a plurality of receive chains connected to each antenna for processing a signal received on each antenna, wherein the signal received on each antenna is split into multiple receive chains for receive processing, and a controller configured to group the antennas into a plurality of sub-groups and assign each carrier to a specific sub-group of antennas such that a signal on each carrier is received on an assigned sub-group of antennas.

Example 2 is the device of example 1, wherein the plurality of carriers belong to a single frequency band.

Example 3 is the device of example 1, wherein the plurality of carriers belong to different frequency bands.

Example 4 is the device as in any one of examples 1-3, wherein the controller is configured to assign at least one of the carriers to all antennas.

Example 5 is the device as in any one of examples 1-4, wherein MIMO is implemented on a carrier using sub-group of antennas assigned to the carrier.

Example 6 is the device as in any one of examples 1-5, wherein the controller is configured to identify carriers having crosstalk issues and assign the identified carriers to sub-groups of antennas and receive chains having less crosstalk issues.

Example 7 is the device of example 6, wherein the controller is configured to assign the identified carriers to sub-groups of antennas and receive chains based on isolations among antennas and among analog front-end components in the receive chains.

Example 8 is the device as in any one of examples 1-7, wherein a non-contiguous carrier aggregation is implemented over at least two carriers.

Example 9 is the device as in any one of examples 1-8, further comprising a plurality of transmit chains connected to each antenna for transmitting a signal on each antenna, wherein the controller is configured to assign each of a plurality of transmit carriers to a sub-group of antennas such that a signal on each transmit carrier is transmitted on the assigned sub-group of antennas.

Example 10 is the device as in any one of examples 1-9, wherein the carriers belong to different radio access technologies.

Example 11 is a method for receiving multiple carriers with multiple antennas. The method comprises grouping a plurality of antennas of a device into a plurality of sub-groups, wherein multiple receive chains are coupled to each antenna, assigning each one of a plurality of carriers to a specific sub-group of antennas, and receiving signals on each carrier over an assigned sub-group of antennas, wherein a signal on each carrier is received on a sub-group of antennas assigned to each carrier.

Example 12 is the method of example 11, wherein the plurality of carriers belong to a single frequency band.

Example 13 is the method of example 11, wherein the plurality of carriers belong to different frequency bands.

Example 14 is the method as in any one of examples 11-13, wherein a signal on at least one carrier is received on all antennas.

Example 15 is the method as in any one of examples 11-14, wherein MIMO is implemented on a carrier with a sub-group of antennas assigned to the carrier.

Example 16 is the method as in any one of examples 11-15, further comprising identifying carriers having crosstalk issues, and assigning the identified carriers to sub-groups of antennas and receive chains having less crosstalk issues.

Example 17 is the method of example 16, wherein the identified carriers are assigned to sub-groups of antennas and receive chains based on isolations among antennas and among analog front-end components in the receive chains.

Example 18 is the method as in any one of examples 11-17, wherein a non-contiguous carrier aggregation is implemented over at least two carriers.

Example 19 is the method as in any one of examples 11-18, further comprising assigning each one of a plurality of transmit carriers to a specific sub-group of antennas, wherein a plurality of transmit chains are connected to each antenna for transmitting a signal on each antenna and transmitting signals on each transmit carrier on an assigned sub-group of antennas.

Example 20 is the method as in any one of examples 11-19, wherein the carriers belong to different radio access technologies.

Example 21 is a non-transitory machine-readable medium including machine-readable instructions, when executed, to implement a method as in any one of examples 11-20.

Example 22 is a communication device operative to transmit or receive signals over a plurality of antennas each having a respective mixing chain. The communication device comprises a first antenna configuration and associated mixing circuit to process a first signal having more than two carriers, and a second antenna configuration and second associated mixing circuit to process a second signal having more than two carriers.

Example 23 is a mobile device operative to receive or transmit at least two multi-carrier signals over at least two different antenna and mixing configurations. Each configuration is selected to receive or transmit the at least two multi-carrier signals to reduce cross talk interference between mixing chains.

Example 24 is a mobile device configured to receive or transmit a multi-carrier signal over at least four transmit and/or receive antenna paths, at least two of the transmit and/or receive antenna paths having mixing chains with two different LO frequencies than the other two transmit and/or receive antenna paths to reduce LO caused cross talk between mixing chains.

Example 25 is a method of utilizing a plurality of antennas and associated mixing chains, the method including: selecting an antenna and mixing chain combination based on a MIMO signal and reducing potential for interference due to LO frequencies of adjacent mixing chains.

Example 26 is a wireless communication device as shown and described herein.

Example 27 is a method of wireless communication as shown and described herein.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A device for receiving or transmitting multiple carriers with multiple antennas, the device comprising:
   a plurality of antennas for receiving or transmitting signals on a plurality of carriers;
   a corresponding plurality of receive chains connected to each antenna for processing a signal received on each antenna, wherein the signal received on each given antenna is split into the corresponding plurality of receive chains connected to the given antenna for receive processing; and
   a controller configured to group the antennas into a plurality of sub-groups and assign each carrier to a specific sub-group of antennas to receive a signal on each given carrier on the specific sub-group of antennas to which the given carrier is assigned.

2. The device of claim 1, wherein the plurality of carriers belong to a single frequency band.

3. The device of claim 1, wherein the plurality of carriers belong to different frequency bands.

4. The device of claim 1, wherein the controller is configured to assign at least one of the carriers to all antennas.

5. The device of claim 4, wherein multiple-input multiple-output (MIMO) is implemented on a carrier using the specific sub-group of antennas to which the carrier is assigned.

6. The device of claim 1, wherein the controller is configured to identify carriers having crosstalk issues and assign the identified carriers to sub-groups of antennas and corresponding pluralities of receive chains having fewer crosstalk issues.

7. The device of claim 6, wherein the controller is configured to assign the identified carriers to sub-groups of antennas and corresponding pluralities of receive chains based on isolations among antennas and among analog front-end components in the receive chains.

8. The device of claim 1, wherein a non-contiguous carrier aggregation is implemented over at least two carriers.

9. The device of claim 1, further comprising:
a plurality of transmit chains connected to each antenna for transmitting a signal on each antenna, wherein the controller is configured to assign each transmit carrier of a plurality of transmit carriers to a specific sub-group of antennas to transmit a signal on each given transmit carrier on the specific sub-group of antennas to which the given transmit carrier is assigned.

10. The device of claim 1, wherein the carriers belong to different radio access technologies.

11. A non-transitory machine-readable medium storing machine-readable instructions executable to perform:
grouping a plurality of antennas of a device into a plurality of sub-groups, wherein multiple corresponding receive chains are coupled to each antenna;
assigning each carrier of a plurality of carriers to a specific sub-group of antennas; and
receiving signals on each carrier,
wherein a signal on each given carrier is received on the specific sub-group of antennas to which the given carrier is assigned.

12. The non-transitory machine-readable medium of claim 11, wherein the plurality of carriers belong to a single frequency band.

13. The non-transitory machine-readable medium of claim 11, wherein the plurality of carriers belong to different frequency bands.

14. The non-transitory machine-readable medium of claim 11, wherein a signal on at least one carrier is received on all antennas.

15. The non-transitory machine-readable medium of claim 14, wherein multiple-input multiple-output (MIMO) is implemented on a carrier with the specific sub-group of antennas to which the carrier is assigned.

16. The non-transitory machine-readable medium of claim 11, wherein the machine-readable instructions are executable to further perform:
identifying carriers having crosstalk issues; and
assigning the identified carriers to sub-groups of antennas and corresponding receive chains having fewer crosstalk issues.

17. The non-transitory machine-readable medium of claim 16, wherein the identified carriers are assigned to sub-groups of antennas and corresponding receive chains based on isolations among antennas and among analog front-end components in the receive chains.

18. The non-transitory machine-readable medium of claim 11, wherein a non-contiguous carrier aggregation is implemented over at least two carriers.

19. The non-transitory machine-readable medium of claim 11, wherein the machine-readable instructions are executable to further perform:
assigning each transmit carrier of a plurality of transmit carriers to a specific sub-group of antennas, wherein a plurality of transmit chains are connected to each antenna for transmitting a signal on each antenna; and
transmitting signals on each given transmit carrier on the specific sub-group of antennas to which the given transmit carrier is assigned.

20. The non-transitory machine-readable medium of claim 11, wherein the carriers belong to different radio access technologies.

* * * * *

UNITED STATES PATENT AND TRADEMARK OFFICE
CERTIFICATE OF CORRECTION

PATENT NO. : 11,258,506 B2
APPLICATION NO. : 16/761441
DATED : February 22, 2022
INVENTOR(S) : Harald Pretl et al.

It is certified that error appears in the above-identified patent and that said Letters Patent is hereby corrected as shown below:

In the Claims

Column 15, Line 11, Claim 6 delete "havingfewer" and insert --having fewer--.

Signed and Sealed this
Twenty-seventh Day of June, 2023

Katherine Kelly Vidal
*Director of the United States Patent and Trademark Office*